(12) United States Patent
Sinha et al.

(10) Patent No.: US 10,125,924 B2
(45) Date of Patent: Nov. 13, 2018

(54) CONTAINER FOR PRESSURIZED GAS

(71) Applicant: Praxair Technology, Inc., Danbury, CT (US)

(72) Inventors: Ashwini K. Sinha, East Amherst, NY (US); Qiong Guo, Clarence Center, NY (US); Ozlem Yardimci, Lake Forest, IL (US); Stanley M. Smith, Clarence Center, NY (US); Ronald F. Spohn, Getzville, NY (US); Ranko Bursac, Libertyville, IL (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 15/520,690

(22) PCT Filed: Oct. 28, 2015

(86) PCT No.: PCT/US2015/057687
§ 371 (c)(1),
(2) Date: Apr. 20, 2017

(87) PCT Pub. No.: WO2016/069675
PCT Pub. Date: May 6, 2016

(65) Prior Publication Data
US 2017/0307139 A1   Oct. 26, 2017

Related U.S. Application Data

(60) Provisional application No. 62/073,271, filed on Oct. 31, 2014.

(51) Int. Cl.
*F17C 1/00* (2006.01)
*B32B 27/08* (2006.01)
(Continued)

(52) U.S. Cl.
CPC .................. *F17C 1/00* (2013.01); *B32B 1/08* (2013.01); *B32B 27/08* (2013.01); *B32B 27/12* (2013.01);
(Continued)

(58) Field of Classification Search
CPC ...... F17C 1/00; F17C 1/10; F17C 2201/0109; B32B 27/12; B32B 27/08; B32B 1/08
(Continued)

(56) References Cited

U.S. PATENT DOCUMENTS

| 4,588,622 A | 5/1986 | Sukarie |
| 6,290,088 B1 * | 9/2001 | Zdunek ..................... C23C 8/02 106/1.22 |

(Continued)

FOREIGN PATENT DOCUMENTS

| JP | 2008 238491 A | 10/2008 |
| JP | 2010 276146 A | 12/2010 |

*Primary Examiner* — Kareen Thomas
(74) *Attorney, Agent, or Firm* — Donald T. Black

(57) ABSTRACT

Disclosed are articles useful as the body of a container for containing gas under pressure, and containers which comprise the articles to which are affixed valves to control the flow of gas out of the container, wherein the articles comprise a hollow container body, having an external surface and having an opening through which gas can enter or leave the interior of the hollow container body; optionally but preferably a layer of fiber-reinforced polymer around the exterior of the container body, and an external layer of elastomer around and sealed to the external surface of the layer of fiber-reinforced polymer if present or else to the cylinder body.

7 Claims, 5 Drawing Sheets

(51) Int. Cl.
*B32B 27/12* (2006.01)
*B32B 27/40* (2006.01)
*B32B 1/08* (2006.01)
*C08J 7/04* (2006.01)
*F17C 1/10* (2006.01)

(52) U.S. Cl.
CPC .............. *B32B 27/40* (2013.01); *C08J 7/047* (2013.01); *F17C 1/10* (2013.01); *C08J 2333/04* (2013.01); *C08J 2363/00* (2013.01); *C08J 2367/00* (2013.01); *C08J 2379/08* (2013.01); *C08J 2475/02* (2013.01); *C08J 2475/04* (2013.01); *F17C 2201/0109* (2013.01); *F17C 2201/0119* (2013.01); *F17C 2203/066* (2013.01); *F17C 2203/0621* (2013.01); *F17C 2203/0639* (2013.01); *F17C 2203/0646* (2013.01); *F17C 2203/0665* (2013.01); *F17C 2203/0673* (2013.01); *F17C 2203/0675* (2013.01); *F17C 2205/0329* (2013.01); *F17C 2205/0394* (2013.01); *F17C 2221/011* (2013.01); *F17C 2221/012* (2013.01); *F17C 2221/013* (2013.01); *F17C 2221/016* (2013.01); *F17C 2221/017* (2013.01); *F17C 2221/03* (2013.01); *F17C 2221/031* (2013.01); *F17C 2221/033* (2013.01); *F17C 2223/0123* (2013.01); *F17C 2223/036* (2013.01); *F17C 2260/012* (2013.01); *Y02E 60/321* (2013.01)

(58) Field of Classification Search
USPC .... 220/581–592, 560.04–560.15, 565–567.3
See application file for complete search history.

(56) References Cited

U.S. PATENT DOCUMENTS

| | | | |
|---|---|---|---|
| 7,255,245 B2* | 8/2007 | Oliveira | F17C 1/04 220/586 |
| 8,505,762 B2* | 8/2013 | Holbach | F17C 13/06 220/586 |
| 8,919,597 B2* | 12/2014 | Handa | B60K 15/03 220/562 |
| 2008/0178809 A1* | 7/2008 | Spohn | C23C 16/4409 118/726 |
| 2011/0253283 A1* | 10/2011 | Kaplan | B60C 9/12 152/540 |

\* cited by examiner

CONTAINER FOR PRESSURIZED GAS

FIELD OF THE INVENTION

The present invention relates to containers, also referred to as cylinders, that may be used to store compressed gas at elevated pressures. More particularly, the invention is related to containers which include a wrapping such as carbon fiber composite, which also include a thermoplastic elastomer polymeric coating around the wrapping which is able to provide protection for the wrapping against external mechanical impacts and environmental corrosion, and to provide improved ease of handling and improved appearance for the container.

BACKGROUND OF THE INVENTION

Conventional containers for compressed gas are made of steel or other metal. To increase the capacity of a compressed gas steel cylinder, the thickness of the steel wall is made thicker than regular cylinders in order to reinforce the strength of the walls of the cylinder. Thicker walls allow the cylinder to hold the contents at higher pressure in comparison to a thinner wall cylinder. Thus, the thicker wall of the cylinder increases the storage capacity of the cylinder.

However, on the other hand, increasing the thickness of the cylinder walls also increases the weight of the cylinder. The increased weight of the cylinder makes the cylinder ergonomically difficult to handle and poses operational challenges. As a general measure, doubling the capacity of the cylinder means doubling the weight of the cylinder weight or more, which is very undesirable.

Although designs to reduce the weight of high pressure steel cylinders have been desirable, there is still a need for improving the ability to provide high-pressure, high-capacity cylinders without incurring excessive increased weight of the cylinder.

BRIEF SUMMARY OF THE INVENTION

One aspect of the invention is an article useful as the body of a container for containing gas under pressure, comprising a hollow container body, having an external surface and having an opening through which gas can enter or leave the interior of the hollow container body;

a layer of fiber-reinforced polymer around the exterior of the container body, attached to the external surface of the container body and having an external surface; and a layer of elastomer around and sealed to the external surface of the layer of fiber-reinforced polymer.

Preferably, the layer of elastomer includes some elastomer material that has penetrated into the external surface of the layer of fiber-reinforced polymer.

A further aspect of the invention is an article useful as the body of a container for containing gas under pressure, comprising a hollow container body, having an external surface and having an opening through which gas can enter or leave the interior of the hollow container body; and a layer of elastomer around and sealed to the external surface of the container body.

Another aspect of the present invention is a container useful for containing gas under pressure, comprising any of the aforementioned articles and further comprising a valve connected to the aforementioned opening which can selectively prevent passage of gas through said opening and can controllably control the flow of gas through said opening.

The containers of the present invention are particularly useful for containing gas at pressure of at least 1000 pounds per square inch (psia) and more particularly at least 4000 psia up to 8000 psia.

By "gas" is meant not only gases of only one chemically distinct component in its gaseous state (such as oxygen, nitrogen or carbon dioxide), but also mixtures of two or more chemically distinct components in their gaseous states (such as air, as well as compositions in which one component of interest is present in mixture with one or more additional gaseous products, examples being compositions of 90 vol. % oxygen, and compositions of small or trace amounts of one substance with the balance being one or more additional diluents or makeup gas(es)).

Each layer of material that is "attached" or "sealed to" another, underlying, surface or layer in this invention, is preferably in continuous contact with the underlying surface to which it is applied, throughout the extent of the underlying surface. That is, each overlying layer contacts all of the underlying surface, without voids or discontinuities or areas where a region in which the underlying surface is not in contact with the overlying layer is surrounded by a region where the underlying surface is fully in contact with the overlying surface.

The invention is applicable to all cylinders or tanks for containing and dispensing gas useful in any applications in, for instance, electronics, medical, and industrial usages.

DETAILED DESCRIPTION OF THE INVENTION

Figure 1:
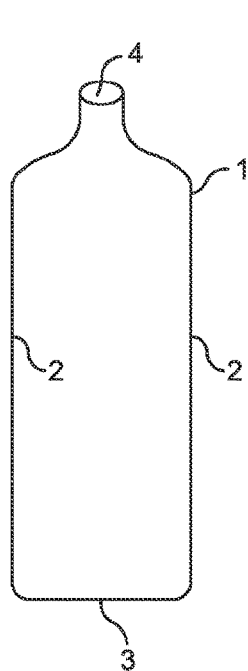
FIG. 1 is a perspective view of a container body according to the present invention.

Referring first to FIG. 1, a hollow container body 1 includes side wall 2 which is preferably circular in its horizontal cross-section. The body 1 has base 3 which is preferably flat so as to enable body 1 to stand on a flat surface without tipping over. Body 1 includes opening 4 through which gas can enter and exit the interior 5 (seen in FIG. 3) of the body.

Figure 2:
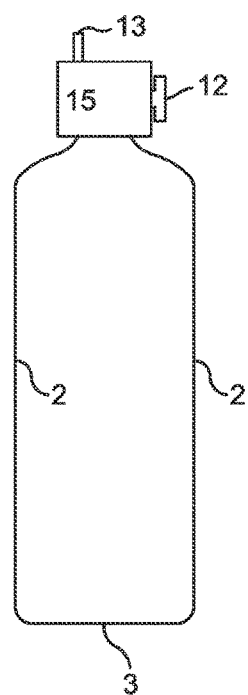
FIG. 2 is a perspective view of a container body including a valve according to the present invention.

FIG. 2 is a view of the article shown in FIG. 1, but now also including valve 15 which fits across opening 4. Visible in FIG. 2 are control knob 12, by which flow of gas through opening 4 can be controlled, and outlet 13 through which gas passes as it leaves body 1. Valve 15 represents but one of a large variety of units which control whether or not gas passes out of body 1, and control the rate of flow of gas out of body 1.

FIGS. 3, 3a, 3b, 4a, 4b and 5 are cross-sectional views of some of the possible embodiments of a cylinder according to the present invention whose exterior could be as shown in FIG. 2, in which valve 15 is seen to extend across opening 4 so that the only way that gas can exit interior 5 of body 1 is by passing through valve 15. As depicted, valve 15 comprises control knob 12 which is attached to threaded stem 14 that is threaded through a hole in valve 15 so that turning knob 12 moves the end 17 of stem 14 into or out of passageway 14. This, stem 14 can be put into a position in passageway 16 so that the passage of gas through valve 15 and out of body 1 can be shut off, and the rate of flow of gas through passageway 16 can be controlled by adjusting the position of end 17 by turning knob 12. It will be recognized that for purposes of this invention, many other embodiments of valves and regulators can be substituted for the valve 15 which is in FIG. 3.

Figure 3:
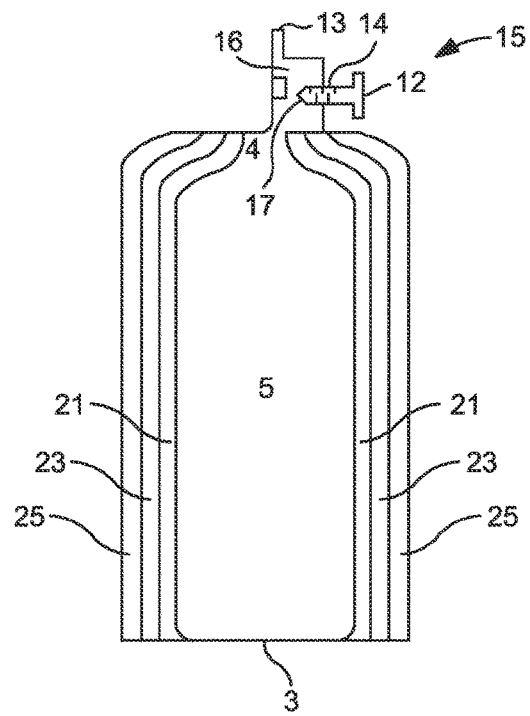
FIG. 3 is a cross-sectional view of a container body of FIG. 2.
Figure 3A:
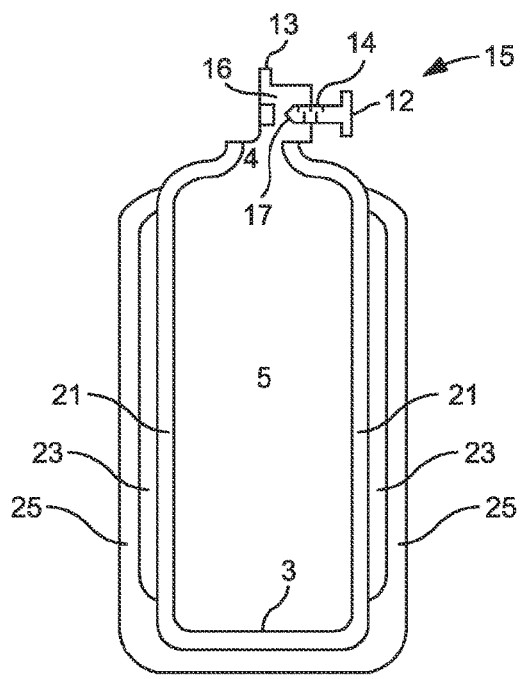
FIGS. 3a and 3b are cross-sectional views of alternative embodiments of the present invention.
Figure 3B:
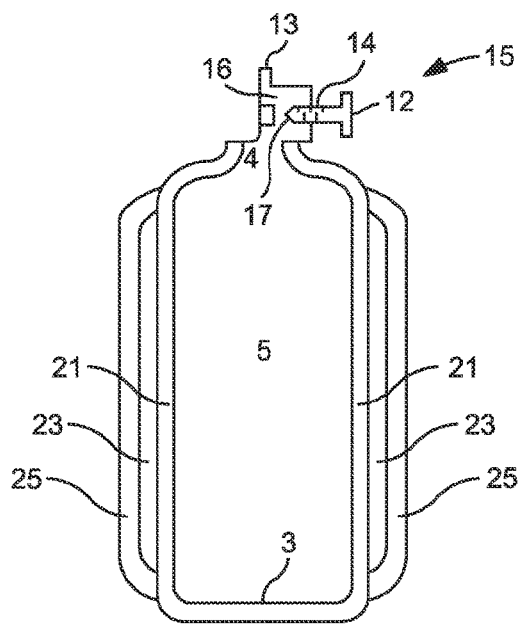
Figure 4A:
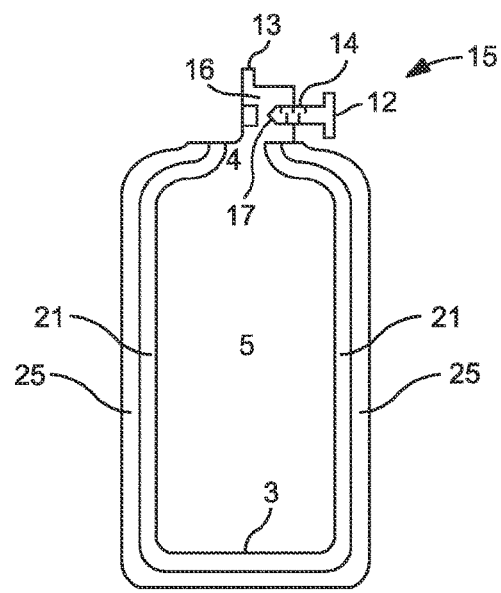
FIGS. 4a and 4b are cross-sectional views of alternative embodiments of the present invention.
Figure 4B:
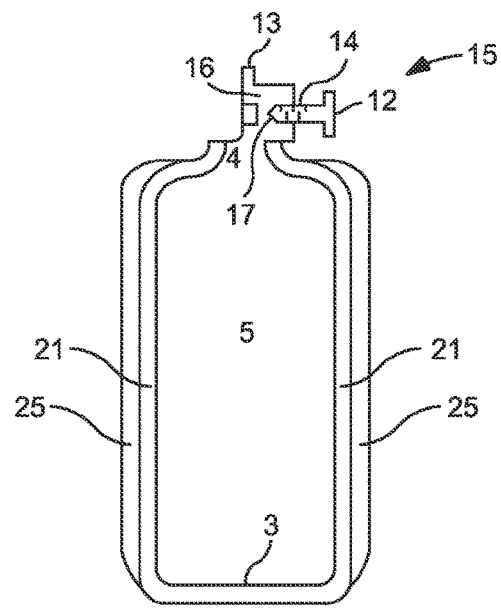

The following description, of layers 21, 23 and 25 apply to each of the embodiments shown in FIGS. 3, 3a, 3b, 4a, 4b and 5 (except of course for the absence of layer 23 from the embodiments of FIGS. 4a and 4b. In FIGS. 3, 3a, 3b and 5, the depictions of layers 21, 23 and 25 are enlarged relative to the size of interior space 5 for ease of reference. Likewise, in FIGS. 4a and 4b, the depictions of layers 21 and 25 are enlarged relative to the size of interior space 5 for ease of reference.

FIG. 3 shows a hoop wrapped composite cylinder which has the composite wrapping 23 on the sides of the main body 21 of the cylinder, and the coating 25 covering the composite wrapping 23.

FIG. 3a shows a hoop wrapped composite cylinder which has the composite wrapping 23 on the sides of the main body 21 of the cylinder. The coating 25 covers the composite wrapping 23 and the cylinder bottom 3.

FIG. 3b shows a hoop wrapped composite cylinder which has the composite wrapping 23 on the sides of the main body 21 of the cylinder. The coating 25 only covers the composite wrapping 23. The bottom edge of the coating 25 extends beyond the bottom edge of the wrapping 23 and is generally 0.5 to 2 inches away from the cylinder bottom 3.

FIG. 4a shows a regular steel cylinder 21. The coating 25 covers the entire body of cylinder 21 including the sides and the cylinder bottom 3.

FIG. 4b shows a regular steel cylinder 21. The coating 25 only covers the sides of cylinder body 21. The bottom edge of the coating 25 is typically a distance of 0.5 to 2 inches away from the cylinder bottom 3.

Figure 5:
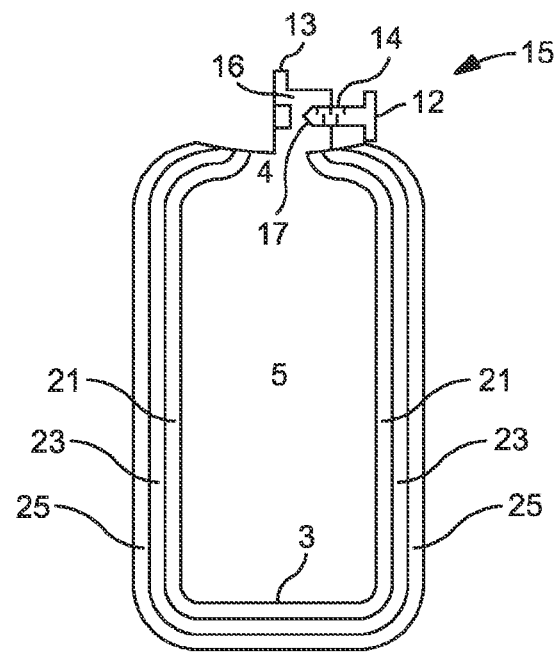
FIG. 5 is a cross-sectional view of an alternative embodiment of the present invention.

FIG. 5 shows a fully wrapped composite cylinder which has the composite wrapping 23 on the sides and on the bottom 3 of the main body 21 of the cylinder, and the coating 25 covering the composite wrapping 23 on the sides and on the bottom 3 of the cylinder.

Layer 21 is made of material that provides the container with strength and with ability to retain its given shape, even while holding gaseous contents at high pressure. The preferred material is steel. Other suitable materials include other metals, such as aluminum, and polymeric material. The thickness of layer 21 should be sufficient that the container of this invention holds the gas contents even at pressures of at least 1000 psia or even at least 4000 psia.

One advantage of the present invention is that layer 21 can be on the order of 4 mm to 7 mm thick, which is the typical range of thickness for steel cylinders that contain gas at the more conventional pressures of up to several hundred psia. That is, the containers of the present invention can hold gas at high pressures (i.e. at least 1000 psia) without the thickness of the steel or other material having to be increased (i.e. to 8-14 mm or thicker) to handle the high pressure.

Layer 23 which is present in embodiments such as those of FIGS. 3, 3a, 3b and 5, comprises material that provides additional strength to the container, that is, it adds to the ability of the container to avoid bursting in response to the high pressure of the gaseous contents inside the container. The amount of material that is in layer 23 is lighter than the amount of material that would be in layer 23 to provide the same additional strength if layer 23 was made of the same material of which layer 21 is made. Layer 23 provides structural strength to the cylinder walls and increases the container's ability to hold higher pressure and hence increases the storage capacity of the container. The storage capacity can be adjusted to a desired level by providing wrapping of layer 23 to a thickness that accommodates the pressure that would correspond to the desired storage capacity. Preferably, layer 23 is 1 to 10 mm thick.

Preferred material for layer 23 is fiber-reinforced polymer, in which fibers are embedded in a polymeric matrix. Examples of suitable reinforcing fibers include carbon fiber (which is preferred), glass fiber, and polymeric fibers such as fibers of aramid, polyester, and polyamide (e.g. nylons). Examples of suitable polymers for the polymeric matrix include epoxy resins, polyesters, vinyl esters, and polyimides.

The fiber is embedded into the polymeric matrix in order to make the matrix stronger, while keeping its light-weight property. The fiber-matrix composite can be hoop-wrapped in a known manner on the compressed gas container via, for instance, filament winding. A filament winder can pull fibers, for example carbon fiber, through a wet bath of polymer solution, for example, epoxy resin, and wind the polymer-wetted fiber over a rotating cylinder, in one orientation or in a series of different orientations. The composite of polymeric resin matrix and fiber is cured at either room temperature or elevated temperature, so that the fiber is tightly embedded into the polymer matrix.

The polymer matrix, in most cases, needs to meet certain requirements in order to be suitable for the fiber reinforcement process. The polymer matrix needs to fully saturate and properly bond with the fiber within the controlled curing conditions and curing period. Preferably, the matrix should bond chemically with the fiber reinforcement. The matrix should also be able to fully swaddle the fibers in order to protect them against external impact, for instance, cut. The matrix itself also needs to be chemically and physically stable during and after the molding process. On the other hand, the fiber needs to uniformly distribute into the resin matrix. When adjacent fibers come out from the resin bath, they need to be kept separate from each other to avoid localized reinforcement. Optimum bonding between fiber and matrix is usually determined to select the proper type of polymer and set up the molding process. Typically, the type of fiber has its preferable type of materials for the polymeric matrix. For example, glass fiber works best with polyester, while carbon fiber works best with epoxy.

Layer 23 provides strength to container 1. Layers 21 and 23 may be capable of flexing slightly in response to high pressure within the container. Layer 23 assists layer 21 by having the capacity to flex slightly.

Layer 25 maintains the durability and longevity of the light-weight fiber-reinforced polymeric composite wrapping layer 23. Layer 25 provides a protective coating, which can stand against mechanical and environmental impacts that could result in corrosion and/or reduction of pressure integrity. The protective coating should also be user friendly and appropriate to put labels on, in addition, be able to be tunable with various color and textured finish.

The exterior surface of all such cylinders or tanks must be clean and hygienic for applying the protective coatings.

Overall, to be used effectively as the protective coating on the carbon fiber or other fiber-reinforced polymeric composite wrapped storage container (in the embodiments of FIGS. 3, 3a, 3b and 5), or as the protective coating on the container 21 (in the embodiments of FIGS. 4a and 4b), the coating must exhibit the following properties:

Flexible to accommodate for expansion and compression of the cylinder wall due to pressure and temperature variation
Can be applied in melt state
Low creep
Abrasion and impact resistance
Strong adhesion on the carbon fiber composite wrapping
Resistant to harsh environmental conditions
Tunable color It has been determined as one aspect of the present invention that polymers in the thermoplastic elastomer family can serve as the protective coating for the fiber-reinforced polymeric composite wrapping or for the cylinder body itself. The properties exhibited by thermoplastic elastomers make them excellent candidates for this application, based on the requirements for protective coatings. The examples of suitable thermoplastic elastomeric polymers are polyolefin, polyamide, polyester, polyurethane, and polyurea, and copolymers and physical mixtures of such polymers. The properties that the thermoplastic elastomer polymers generally provide include the following:

Moderate elongations
Ability to return to original configuration upon removal of stress
Applicable at melt state at elevated temperature
Absent of significant creep
Crosslinked matrix with chemical and mechanical resistance
Variable characteristics based on composition and formulation It has further been determined that polyurea and polyureaurethane thermoplastic elastomer polymers exhibit additional characteristics, which make them especially preferred for this application. The properties include:

Tack free in 10 seconds or less
Zero or very low VOC (volatile organic compound) content
Excellent chip, abrasion, impact, tearing, and chemical resistance
Durable and flexible over wide temperature range
Ability to maintain original gloss and color after subjected to UV exposure and humid environments In addition to the property requirements for the protective coating, it has also been determined that the high-pressure storage containers such as those of the present invention are subjected to specific operational conditions during practical usage. The conditions include:

Temperature range −40 C to +60 C
Mechanical impact above 120 in-lb
Direct and continuous sunlight exposure
Exposure to rain, fog, and/or salty water
Continuous usage up to 15 years or even up to 30 years The protective coating as layer 25 to cover the composite wrapping layer 23 or applied directly to the cylinder body 21 may be presented within a reasonable thickness range, 1-8 mm, preferably, 2.5-5 mm. If the said coating is too thin, the strong mechanical properties are not achievable and the coating finish is conformal to the composite wrapping underneath; if the said coating is too thick, it may change the configuration of the gas cylinder and increase the difficulty to handle the gas cylinder. Thus, the said layer 25 is preferably thinner than layer 23.

The layer 25 may be in the form of a sleeve that fully covers the wrapping layer 23 or the body of the cylinder, or in the form of encapsulation including both the body with composite wrapping layer 23 (if present) and the base with bare steel. Typically, layer 25 is a coating which has a smooth exterior finish, which allows people to put and replace informative labels on the container and gives the exterior surface of the container an attractive appearance. In the case of coating encapsulation, however, the smoothness may cause slippage when people move the cylinder on the floor. The invention includes an option to add a non-slip feature to the bottom 3 at the coating surface, by stamping texture during the coating solidification or blending additional particles when the coating is applied to the base of the cylinder.

The chemistry of the coating that comprises later 25 is preferably chemically resistant and impermeable. The said coating needs to be flexible to accommodate for expansion and compression of the cylinder wall due to pressure and temperature variation, and mechanically strong enough to withstand against mechanical impacts. If the coating is hard enough but too brittle, its performance could degrade over time as repeated gas filling causes the cylinder to expand and compress even slightly, but repeatedly. The said coating also needs to be chemically resistant. If humidity and chemicals can penetrate through the coating and attack the cylinder body or attack the resin, which is bonded with the carbon fiber and holds the wrapping together, the integrity of the cylinder could be affected. Thus, the coating layer 25 of the present invention is chemically resistant and impermeable in order to protect the cylinder and the composite fiber resin of layer 23 when layer 23 is present.

The preferred coating materials of layer 25 in this invention are thermoplastic elastomers. Thermoplastic elastomers are a class of copolymer or a physical mix of polymers with both thermoplastic and elastomeric properties. They show great advantages over both rubbery materials and plastic materials. The thermoplastic elastomer comprises rubbery polymer segments covalently linked to or physically mixed with the incompatible hard materials. It provides physical crosslinks and reinforcements. Suitable thermoplastic elastomers need to maintain the desired excellent properties, for instance, chemical and mechanical resistance, flexibility for expansion and compression along with the high-pressure containers, and ease of handling and application, without being costly and environmentally unfriendly.

The recommended thermoplastic elastomers for use as protective coatings as layer 25 in this invention are polyesters, polyurethanes, polyureas, polyimides, and their mixture and compositions. Preferred are polyurethane and polyurea with flexible diol and/or flexible diamide segments. More preferred are polyureas because of their combination of strong resistance to both chemical corrosion and mechanical impacts. The possible combinations producible between diisocyanate and short chain diamides and long chain diamides have unlimited amount of variations, including tuning the structure and/or molecular weight of the reaction compounds. This allows the urea chemists to provide polymer structure with the most desired properties of the final product. In some cases, it is also acceptable to mix the chemistry of polyurea and polyurethane to reduce the overall cost. The various combinations of short chain diols and long chain diols to produce urethane bonds also provide flexibility of the properties for the final thermoplastic polyurea and polyurea-urethane coating as the protective coating on the fiber-reinforced composite wrapped storage containers.

Polyurea, as the preferred type of elastomeric protective coating for layer 25, is the reaction product of an isocyanate component and an amine-terminated component. Isocyanate designates organic compounds containing an isocyanate group, with the formula $R_1$—(N=C=O)$_n$ wherein $R_1$ is selected from the group consisting of aliphatic, aromatic, arylaliphatic, and cycloaliphatic groups with 1 to 30 carbon atoms, and the number n of isocyanate functional group is 1 to 3 (wherein the isocyanate compounds with two isocyanate groups are known as diisocyanates, and those with three isocyanate groups are known as as polyisocyanates). Examples of diisocyanates and polyisocyanates that can be practically used to produce polyurea coating are methylene diphenyl diisocyanate, hexamethylene diisocyanate, toluene diisocyanate, and isophorane diisocyanate.

Isocyanates are electrophiles, and tend to react with nucleophiles including alcohols, amines, and even water. When a diisocyanate reacts with a diol or polyol containing two or more hydroxyl groups, a polymer chain is formed which is known as polyurethane. The analogous reaction between a diisocyanate and a compound containing two or more amine groups produces a product which is known as polyurea. The compounds containing two or more amine groups have the formula $R_2$—(NH$_2$)$_a$, wherein $R_2$ is selected from the group consisting of aliphatic, aromatic, arylaliphatic, and cycloaliphatic groups with 1 to 30 carbon atoms and the number a of amine groups is 1 to 3. The amine group (—NH$_2$) joins the isocyanate group (—N=C=O) to form a urea linkage (—(NH)$_2$—C=O). If the numbers of amine groups and isocyanate groups are more than one, another amine groups then react with other isocyanate group to form the long chain and cross-linked polyurea polymer. Examples of diamine and polyamine that can be practically used to produce polyurea coatings useful as layer 25 in the present invention include hexamethylenediamine, tripropylenegly-coldiamine, glyceryl poly(oxypropylene)triamine, and diethyltoluenediamine.

The layer 25 is preferably solvent-free. In order to be able to control the thickness of layer 25 when it is formed, the materials forming layer 25 are applied on the surface of the cylinder body or on the surface of layer 23, as the case may be, in the liquid state. These materials start to solidify through chemical reaction and undergo state change. It is preferred that the chemical reaction goes through completion to result in a solvent free coating, and that all the reactants are fully consumed. The chemical reaction happens when the components of the coating materials meet at the surface to which they are applied, for example polydiamides and poly-diisocyanate reacting to form polyurea. The two components react and start to crosslink once they meet, preferably at a suitable elevated temperature at which the reaction proceeds, preferably with no vapor generated during the chemical reaction.

The layer 25 in the present invention must possess certain mechanical properties, such as strong resistance to abrasion and impacts. Otherwise, even in normal transportation, handling, and operation of the gas cylinders, cutting and collision can cause wounds on the exterior surface of the cylinder. If the composite wrapping layer 23 or the cylinder body 21 without protection is wounded by mechanical impacts, the integrity of the pressurized gas cylinder is likely to be affected immediately. For minor damages, it might be possible to repair the composite wrapping layer 23; for severe damages, however, the cylinder would likely need to be discarded. Also, the layer 23 can experience various environmental damages, from causes such as continuous UV exposure, high/low temperature, humidity, chemical corrosion, etc. Such environmental factors can weaken the strength of the carbon fiber composite and cause separation between the wrapping 23 and the outside of the layer 21, which risks reducing the pressure integrity of the gas cylinder. Thus, the direct exposure of the unprotected fiber composite 23 to the environment can significantly reduce the longevity of the gas cylinder.

Besides the advantage of providing layer 23 and cylinder body 21 with protection, the layer 25 described herein provides other advantages. For example, the color of a gas cylinder or container typically indicates the composition of the gas stored inside, but the carbon fiber wrapping itself is not readily capable of taking and retaining different colors. In additional to the color, labels are usually put on gas cylinders to show information concerning its composition and health/safety requirements, but they cannot be applied onto the bare carbon fiber composite wrapping. The layer 25 described herein can be colored and can have labels attached to it, while retaining the desired color and labels.

One advantage of the layer 25 as described for the present invention is that it can withstand against aggressive abrasion with only negligible weight and thickness loss. For example, if using ASTM D4060 (14) testing procedure on a container prepared as described herein, with C-17 wheels at 1000 g load and 1000 rounds, the weight loss is not detectable; with H-18 wheels, a much harsher surface finish than C-17, at 1000 g load and 1000 rounds, the weight loss is 50-300 mg, preferably 100-200 mg or less, and up to 2000 rounds, the weight loss is 100-500 mg, preferably 200-300 mg or less.

The coating described herein as layer 25 also stands against impacts described by ASTM procedures with only surface materials migration or slight indentation; more preferably, no dents resulted by the impacts. For example, using ASTM G14 (04) testing procedure, the coating has great impact resistance above 90 in-lb; more preferably, above 150 in-lb without surface materials migration or dents.

The coating described herein as layer 25 stays attached to the substrate (layer 23 or cylinder 21) to which it is applied. Due to the repeated filling and evacuating of the gas container, the steel or other material of layer 21 undergoes slight expansion and relaxation as does layer 23. The repeated cycles of expansion and relaxation will not cause problems to the composite wrapping of layer 23 due to its extreme high tensile strength, but it could cause dis-bonding at the interface of layers 21 and 23. Once the dis-bonding happens at the edge, the interface will be exposed to the outside environment, with the risk that water and dirt could enter into the interface and attack the resin of layer 23. The elastomeric properties of the coating used as layer 25 need to be selected within certain range, for elastic modulus and permanent deformation.

Elastic modulus describes the amount of force per unit area (stress) needed to achieve a given amount of deformation. A higher modulus typically indicates that the material is harder to deform. However, if the elastic modulus is too high, for example, higher than metal liner used as layer 21 or composite wrapping used as layer 23, when expansion happens, the deformation of layer 25 is much smaller than the deformation of layer 23 or layer 21, which causes stress or friction happening within the interface under layer 25. With repeated expansion and relaxation, it may damage the surface that contacts underneath layer 25, and further reduce the package integrity. The elastic modulus of layer 25, which can be measured per ASTM D638 (14), is preferably to be 0.1-17, more preferably to be 0.5-5.

Not only the layer 25 is easy to deform, it also needs to return to its original shape after the stress is removed. In another word, layer 25 needs to expand and relax together with the layer 23 or layer 21. Permanent deformation describes the increase in length of an elastomeric material resulting from cyclic stretching and relaxation. This property is a visible indication of the realignment of intermolecular bonds within the layer 25. If the permanent deformation percentage is too high, the coating used as layer 25 will expand after repeated filling and evacuating, but not return to its original configuration at certain point. However, with the layer 23 and layer 21 returning to their original shapes, there possibly generates a gap at the interface underneath layer 25, where dirt and/or water can be trapped and cause damage to the reinforced layers. Therefore, the permanent deformation of layer 25, which can be measured per ASTM D2731 (15), is preferably to be below 20%, more preferably to be below 10%.

In order to survive in cyclic expansion and relaxation, the coating used as layer 25 in this invention needs to adhere on the wrapping surface 23 very well. For example, using ASTM D4541 (09) testing procedure, the adhesion failure happens between coating and composite wrapping above 400 psi, more preferably, above 600 psi. The great adhesion of the elastomeric coating on the composite cylinder eliminates the possibility of the dis-bonding at the interface and the coating peeling off from the wrapping surface. The coating of layer 25 preferably exhibits resistance against cutting. A utility knife is not able to cut through the coating, and high pressure and high speed are necessary to apply on the blade to create a cut in the coating. Once a cut is created, the coating preferably cannot be peeled off, more preferably, cannot be pried off. For example, using ASTM D6677 (07) testing procedure to create a "X" cut and probe the "X" cut to loosen the coating. The layer 25 is preferably to be difficult to remove (rating 8, or 9), or more preferably to be extremely difficult to remove (rating 10). If a minor cut is created and no wound is on the composite wrapping from the cut, the cut area can be repaired locally.

Preferably, the innermost surface of the coating of layer 25 extends into (below) the outer surface of layer 23. This can be achieved during the process of coating application, for example, by utilizing high pressure during spraying the coating materials to promote the penetration of the material of layer 25 into the outer surface of layer 23. Appropriate penetration of the coating materials into layer 23 can improve the adhesion of layer 25 on layer 23, against peeling, while maintain the integrity of the entire package. If the depth is too small, it does not provide strong enough adhesion; however, if the depth is too large, it can possibly damage the resin of layer 23 and reduce the strength of layer 23. The penetration depth is preferably to be 50-300 μm (microns), more preferably to be 100-200 μm.

Figure 6:
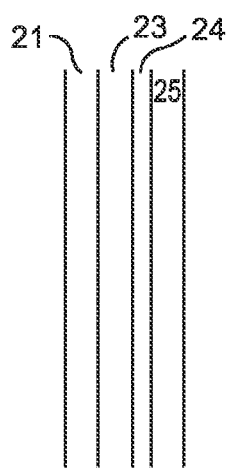
FIG. 6 is a close-up cross-sectional view of a preferred embodiment of the present invention.

This aspect of the invention is illustrated in FIG. 6, wherein layers 21, 23 and 25 are as described herein. However, in this embodiment, layer 23 does not contain any elastomer, and layer 25 does not contain any of the fiber-reinforced polymer, and between layers 23 and 25 there is a region 24 which is composed of a mixture of the materials of which layers 23 and 25 are formed. Region 24 can include the reinforcing fibers described herein. Region 24 is formed by penetration of the material of layer 25 into the material of layer 23. The thickness of region 24 is typically 50 to 300 microns, preferably 100 to 200 microns. Thus, this aspect of the invention can be characterized as including layer 23 of fiber-reinforced polymer which includes regions where layer 23 does not contain said elastomer, and including layer 25 of elastomer which includes regions that do not contain said fiber-reinforced polymer, and including layer 24 between layers 23 and 25 comprising a mixture of said elastomer and said fiber-reinforced polymer wherein layer 24 is 50 to 300 microns thick, preferably 100 to 200 microns thick.

Figures 7A, 7B:
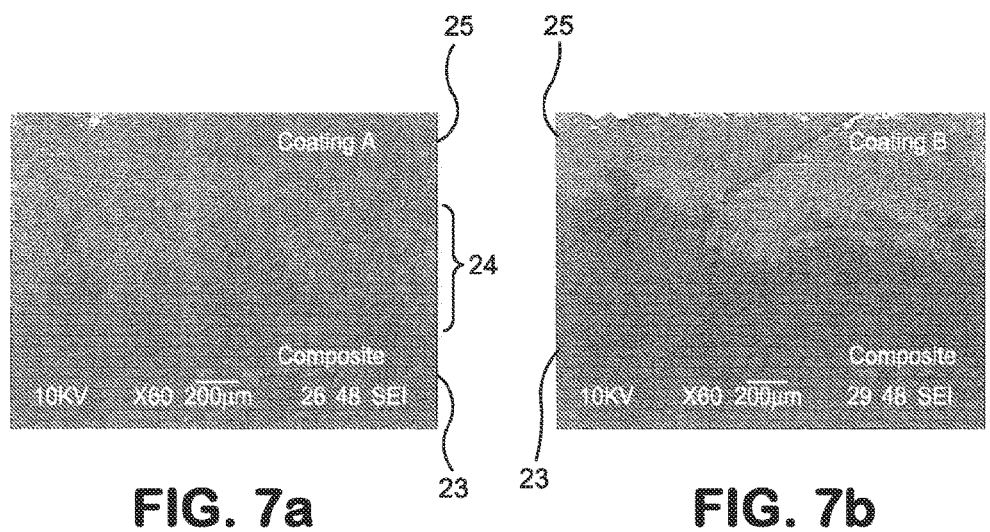
FIGS. 7a and 7b are scanning electron microscope (SEM) views of a portion of the coatings of an embodiment of the present invention.

FIGS. 7a and 7b further illustrate this aspect of the invention. Elastomer layer 25 (which appears as lighter gray in shade) and fiber-reinforced polymer layer 23 (which appears as darker gray in shade) are shown in both Figures. Layer 24 which appears in FIG. 7a is a region in which some of the elastomer material of layer 25 is present in polymer layer 23 having penetrated into polymer layer 23.

The compressed gas container of the present invention may experience various types of weather, including hot temperature above 100 F, cold temperature below −20 F, continuous sun burning, dramatic temperature change, and raining pouring. All the harsh environmental conditions can degrade the resin in the fiber composite wrapping of layer 23 and harm the integrity of the pressurized cylinder if layer 23 is left uncovered with a coating. But the coating 25 in this invention is stable and durable through cycling environments, for example, temperature, UV, and humidity. The said coating will maintain high levels of mechanical properties of abrasion resistance, impact resistance, cutting and peeling resistance, and adhesion on the composite wrapping after cycling temperature −20 F to 100 F, preferably −40 F to 120 F, and more preferably −60 F to 160 F. The said coating will maintain the good mechanical properties after continuous UV exposure and cycling 40% to 100% humidity for 500 hours, preferably 1000 hours.

Aliphatic polyurethane and polyurea coating materials are preferred in the present invention, because of their resistance to discoloration following exposure to UV radiation. Aromatic polyurethane and polyurea materials may be used too, in the case of none or limited exposure to UV radiation, and with an additional layer of UV resistant paint in the case of normal exposure to UV radiation.

Other chemicals optionally included in layer 25 according to the present inventions are primer and UV-resistant paint. The primer is used to enhance the adhesion between adjacent layers 21 and 23, and/or 21 and 25, and/or 23 and 25, especially if the base and neck areas of a cylinder need to be coated. The chemistry of primer could be epoxy based or silicon based, and it needs to be chemically compatible with the polymeric resin that is in the composite layer 23. The UV-resistant paint could be applied on top of layer 25 to reduce the degradation caused by UV exposure. The paint is preferably water-based, sprayable or brushable, and capable of drying at ambient temperature. The paint is also used to reduce the chance of rusting of the steel cylinder 21.

The layer 25 can be in a color that is based on application and customer needs. More preferably, the color could be contrast from the underlying layers 21 and 23, to show more clearly any cuts or other damage to the layer 25. For example, a black carbon fiber composite as layer 23 or cylinder 21 is preferably coated with material in a lighter color as layer 25, with the light colored layer 25 optionally being top-painted with a dark color.

In practice, the valve 15 is fitted onto a container of the present invention. Then the desired gas is fed into the container through the valve. Thus, preferably the valve is of the type that is known in this field, through which gas can be fed into the container, until the gas in the container exhibits the desired pressure at which point the feeding is discontinued, and the valve retains the gas in the container at that pressure. The result then is a container having the characteristics described herein, and containing gas at a pressure that is preferably at least 1000 psig, more preferably at least 4000 psig, typically up top 8.000 psig. The gas in the container can be any product that is gaseous at ambient conditions (25° C. and 1 atmosphere pressure) or can be a mixture of two or more such products. Examples include air, nitrogen, oxygen, hydrogen, helium, argon, carbon dioxide, hydrogen chloride, ammonia, methane, oxides of nitrogen, sulfur hexafluoride, and mixtures thereof. When the gas in the container is to be a mixture of gases, the mixture can be formed prior to feeding it into the container, or the components of the desired mixture can be fed individually in sequence into the container whereby the mixture is formed within the container and not prior to being fed into the container.

The invention is illustrated by the following examples. In Tables 1, 2, 3 and 5, columns headed "Preferred" or "Especially Preferred" display target values for particularly satisfactory performance.

EXAMPLES

Cylinder Coating Process

Coatings A and B are evaluated specifically here. Both of them were formed by reaction of two components, namely, poly-diamine and poly-diisocyanate, with a ratio of 1:1 or 1:2. The two components were stored in two separate containers, pumped into a spray booth using the pre-designed ratio, heated, and mixed while being sprayed. These two components met at the surface of a composite cylinder and reaction happened at elevated temperature. After fully reacting, a coating was generated after a very short curing time at room temperature. Tests were carried out in coated coupons of the composite cylinder or fully coated composite cylinder.

Example 1—Abrasion Resistance

Testing Method 1—Abrasion Resistance

Taber abrasion was used to determine the coating's resistance to abrasion, following the procedure ASTM D4060 (14).

The original weight of the test specimen, a material A or B coated steel sample, is measured and recorded. A Taber abrader, wheel H-18, is selected to load 1000 grams. The test specimen is placed on the abrasion tester, and then allowed to spin for 500, 1000, 1500, and 2000 cycles, respectively. The weight of the test specimen was determined and recorded after each run. The abrasion resistance was evaluated gravimetrically.

The abrasion resistance values for coating A and B, and the values for preferred coating according to the invention were as shown in Table 1.

TABLE 1

| | Taber abrasion values | | | |
|---|---|---|---|---|
| | Coating A/ mg | Coating B/ mg | Preferred/ mg | Especially Preferred/ mg |
| After 500 cycles | 73 | 105 | <200 | <100 |
| After 1000 cycles | 145 | 216 | <400 | <250 |
| After 1500 cycles | 209 | 334 | <600 | <400 |

TABLE 1-continued

| | Taber abrasion values | | | |
|---|---|---|---|---|
| | Coating A/ mg | Coating B/ mg | Preferred/ mg | Especially Preferred/ mg |
| After 2000 cycles | 284 | 454 | <800 | <550 |

Example 2—Impact Resistance

Testing Method 2—Impact Resistance

A falling tup, with specific weight and diameter, was used to provide impact, per procedure ASTM G14 (04). The tup was restrained vertically and then allowed to fall from various heights to generate impact energies to the test specimen. Inspection is used to detect resultant breaks on the coating.

The coated composite cylinder coupon was installed on the impact apparatus. The tup was made up from a body and nose, with weight 3.2 lb and ⅝" hemispherical opening. The apparatus dropped the tup from distances ranging from 10" to a maximum 58". The impact values were determined by multiplying the weight of tup and the distance that it travels. The impact resistance was considered to be the impact value at which failure started. The impact resistance values for coatings A and B, and the values for preferred coating according to the invention are as shown in Table 2 Table 2.

TABLE 2

| | Impact resistance values | | | |
|---|---|---|---|---|
| | Coating A/in-lb | Coating B/in-lb | Preferred/in-lb | Especially Preferred/in-lb |
| Failure Description | >90 Slight dent | >180 None | >120 | >180 |

Example 3—Tensile Adhesion

Testing Method 3—Tensile Adhesion

Tensile adhesion was performed to determine the pull-off strength of the coatings in accordance with the procedure ASTM D4541 (09).

The coating was first scored using a hole saw with a diameter close to the pull stubs. Then the pull stubs were attached to the coating surface via epoxy adhesive, which was allowed to cure for 24 hours at room temperature. An Elcometer pneumatic tester was used to pull the stubs and detach them from the substrate within the range 10-3000 psi. If failure occurs at the interface of the coating and the carbon fiber composite, the pulling pressure value is recorded as the tensile adhesion strength, and if failure occurs within the coating layer or from the glue, there are cohesive failure and glue failure, which are not representative for the tensile adhesion.

The tensile adhesion values for coatings A and B, and the values for preferred coating according to the invention are as shown in Table 3.

TABLE 3

Tensile adhesion values

| | Coating A/psi | Coating B/psi | Preferred/psi | Especially Preferred/psi |
|---|---|---|---|---|
| Adhesive failure | >800 | >600 | >300 | >500 |

Example 4—Adhesion Against Peeling

Testing Method 4—Adhesion Against Peeling

Adhesion against peeling was performed to determine the peel-off difficulty of the coatings in accordance with the procedure ASTM D6677 (07).

The coating was first created a "X" cut into the interface of coating and composite wrapping layer, and then loosened by probing the "X" cut with a utility knife or even a pry. If the coating is too thick, a circulate blade attached to a drill can be used to make the "X" cut. The coating is peeled off from the "X" cut and the adhesion was rated on a scale from 0 to 10, with 0 being "easily removed" and 10 being "extremely difficult to remove".

The rating results of removing coatings A and B are as shown in Table 5.

TABLE 4

Rating for adhesion against peeling

| | Coating A | Coating B/psi | Preferred/psi | Especially Preferred/psi |
|---|---|---|---|---|
| Rating | 10 | 0 | 8 | 10 |

Example 5

Testing Method 5—UV and Humidity Resistance

To simulate outdoor weathering, a QUV chamber was used to test the coating's resistance to UV exposure and humidity. The QUV tester exposes the coating to alternating cycles of UV light and moisture, which simulates direct sunlight and rainy weather.

Mechanical properties were tested after QUV exposure for a certain period, here 500 and 1000 hours, following the test methods 1, 2, and 3. The UV and humidity resistance were evaluated based on the testing results.

Color and gloss changes after UV and humidity exposure were also recorded to determine the resistance to the applied environments.

The abrasion resistance, impact resistance, and tensile adhesion values for coatings A and B are as shown in Table 5. In addition, both coating A and coating B maintained glossy appearance after 1000 hours of QUV, however, the color of coating A changed to yellowish from white after 500 hours QUV, while the color of coating B remains unchanged.

TABLE 5

Testing results after QUV

| | Abrasion resistance/mg | | Impact resistance/in-lb | | Tensile adhesion/psi | |
|---|---|---|---|---|---|---|
| | Coating A | Coating B | Coating A | Coating B | Coating A | Coating B |
| 0 hours QUV | 284 | 454 | >90 | >180 | >800 | >600 |
| 500 hours QUV | 426 | 698 | >60 | >180 | >800 | >800 |
| 1000 hours QUV | 493 | 609 | >60 | >180 | >800 | >800 |

Example 6

Testing Method 6—Thermal Cycling

To simulate the outdoor temperature change, an oven and a freezer were used to expose the coatings to temperatures in the range −50 C to +60 C. Mechanical properties were tested post the thermal cycling after a certain period, here 30 days, following the test methods 1, 2, and 3. The thermal resistance was evaluated based on the testing results.

Color and gloss changes after thermal cycling were also recorded to determine the resistance to the applied environments.

The abrasion resistance, impact resistance, and tensile adhesion values for coatings A and B were as shown in Table 6. In addition, both coating A and coating B retained their original colors and gloss after 30 days of thermal cycling test.

TABLE 6

Testing results after thermal cycling

| | Abrasion resistance/mg | | Impact resistance/in-lb | | Tensile adhesion/psi | |
|---|---|---|---|---|---|---|
| | Coating A | Coating B | Coating A | Coating B | Coating A | Coating B |
| 0 day | 284 | 454 | >90 | >180 | >800 | >600 |
| 20 days | 647 | 732 | >90 | >150 | >800 | >800 |
| 40 days | 398 | 552 | >90 | >150 | >800 | >800 |
| 60 days | 603 | 415 | >90 | >150 | >800 | >800 |

Example 7

Penetration of Coating into Composite Wrapping Layer

Penetration of coating materials into the composite wrapping layer within a reasonable depth range can promote the adhesion. The scanning electron microscope (SEM) images shown in FIGS. 7a and 7b are the comparison of coating A and B on the same surface of fiber-reinforced polymer surface. The adhesion against peeling provided by coating A, which has better penetration depth of about 100 to 150 microns, is significantly higher than the adhesion against peeling of coating B, which has a penetration region less than 50 microns. As shown in Example 4, the adhesion against peeling for coating A is rated as 10, "extremely difficult to remove", while coating B is rated to be 0, "easily removed". Meanwhile, the tensile adhesion is relatively the same for coating A and B, as shown in Example 3.

Each coating material being applied to a surface according to this invention needs to be in the liquid state during application (e.g. spraying or other application technique). Thus, the material being applied can be liquid at ambient conditions, or it can be dissolved or suspended in a suitable solvent which is then evaporated after the application. One then allows a period of time for the liquid coating to solidify or fully cure. In addition, the desired degree of penetration of the elastomeric coating material into and through the surface of the polymeric material to which the elastomeric material is applied, is achieved by employing a sufficiently high pressure during spraying for the coating material to penetrate into the polymer layer.

What is claimed is:

1. An article useful as the body of a container for containing gas under pressure, comprising
   a hollow container body, having an external surface and having an opening through which gas can enter or leave the interior of the hollow container body;
   a layer of fiber-reinforced polymer around the exterior of the container body, attached to the external surface of the container body and having an external surface; and
   a layer of elastomer around and sealed to the external surface of the layer of fiber-reinforced polymer, wherein said layer of fiber-reinforced polymer does not contain said elastomer, and said layer of elastomer does not contain said fiber-reinforced polymer, and a layer comprising a mixture of said elastomer and said fiber-reinforced polymer is present between said layer of fiber-reinforced polymer and said layer of elastomer.

2. An article according to claim 1 wherein said elastomer is selected from the group consisting of polyurethanes and polyureas.

3. A container useful for containing gas under pressure, comprising an article useful as the body of a container for containing gas under pressure, comprising
   a hollow container body, having an external surface and having an opening through which gas can enter or leave the interior of the hollow container body;
   a layer of fiber-reinforced polymer around the exterior of the container body, attached to the external surface of the container body and having an external surface; and
   a layer of elastomer around and sealed to the external surface of the layer of fiber-reinforced polymer, and further comprising a valve connected to said opening which can selectively prevent passage of gas through said opening and can controllably control the flow of gas through said opening, wherein said layer of fiber-reinforced polymer does not contain said elastomer, and said layer of elastomer does not contain said fiber-reinforced polymer, and a layer comprising a mixture of said elastomer and said fiber-reinforced polymer is present between said layer of fiber-reinforced polymer and said layer of elastomer.

4. A container according to claim 3 wherein said elastomer is selected from the group consisting of polyurethanes and polyureas.

5. A container according to claim 3 containing gas within said hollow container body at a pressure of 1000 pounds per square inch to 8000 pounds per square inch.

6. A container according to claim 3 containing gas within said hollow container body at a pressure of at least 1000 pounds per square inch.

7. A container according to claim 3 containing gas within said hollow container body at a pressure of at least 4000 pounds per square inch.

* * * * *